United States Patent [19]

Beasley et al.

[11] 3,849,692

[45] Nov. 19, 1974

[54] SURFACE CONDUCTIVE TILTED CHANNEL PLATE ELECTRON MULTIPLIER

[75] Inventors: Robert Malcolm Beasley; Douglas Raymond Mainard; Derek Washington, all of Salfords, near Redhill, England

[73] Assignee: U.S. Philips Corporation, New York, N.Y.

[22] Filed: July 31, 1972

[21] Appl. No.: 276,701

[30] Foreign Application Priority Data

Aug. 2, 1971 Great Britain .................... 36250/71

[52] U.S. Cl. .................... 313/379, 313/400, 313/95, 313/105

[51] Int. Cl. ..... H01j 1/32, H01j 31/48, H01j 43/22

[58] Field of Search .......... 313/105, 67, 68 R, 68 A, 313/95, 103, 104

[56] References Cited

UNITED STATES PATENTS

| | | | |
|---|---|---|---|
| 2,821,637 | 1/1958 | Roberts et al. | 313/105 X |
| 3,062,962 | 11/1962 | McGee | 313/67 X |
| 3,275,428 | 9/1966 | Siegmund | 313/105 X |
| 3,374,380 | 3/1968 | Goodrich | 313/105 X |
| 3,564,323 | 2/1971 | Maeda | 313/105 |

*Primary Examiner*—Herman Karl Saalbach
*Assistant Examiner*—Siegfried H. Grimm
*Attorney, Agent, or Firm*—Frank R. Trifari

[57] ABSTRACT

A surface conducting channel intensifier has a matrix plate in which the channels are tilted with respect to the normal to the matrix faces and the inner surface of each channel provides areas of different conductivity. The conductivity is greatest in the regions of the channel which have the greatest inclination to the normal and the conductivity is least in the regions of smallest inclination.

8 Claims, 29 Drawing Figures

SURFACE CONDUCTIVE TILTED CHANNEL PLATE ELECTRON MULTIPLIER

This invention relates to "channel intensifier" devices (or, more briefly, "channel plates") which are secondary-emissive electron-multiplier devices comprising a matrix in the form of a plate having a large number of elongate channels passing through its thickness, said plate having a first conductive layer on its input face and a separate second conductive layer on its output face to act respectively as input and output electrodes. Such devices will be referred to as devices of the kind set forth.

In the operation of such intensifier devices a potential difference is applied between the two electrode layers of the matrix so as to set up an electric field to accelerate the electrons, which field establishes a potential gradient created by current flowing through resistive surfaces formed inside the channels or (if such cannel surfaces are absent) through the bulk material of the matrix. Secondary-emissive multiplication takes place in the channels and the output electrons may be acted upon by a further accelerating field which may be set up between the output electrode and a suitable target, for example a luminescent display screen.

An image transfer tube using such a device will be referred to for convenience as an "image intensifier" tube rather than as an "image converter" tube even in applications where the primary purpose is a change in the wavelength of the radiation of the image. Other relevant imaging tubes are C.R.T.s and camera tubes.

It is an object of the present invention to overcome or mitigate the problem of ion feed-back which arises in the practical use of channel plates. In an individual channel, ions are fed back from parts of the wall and interior space of the channel (these can be referred to as "channel ions") and in single channel multipliers this problem has been solved by considerable curvature of the channel tube (e.g. 360° in the form of one complete helical turn).

In the case of channel plates used in image intensifiers, ion feedback may also derive from the phosphor display screen when such a screen is located at the output end of the channels. Furthermore, it now appears that many ions are generated also in the gap between such screen and the channel plate (such ions will be referred to as "gap ions").

When ion feedback occurs, the ions are accelerated by the field in the channels and can cause spurious secondary emission further back in the channels and/or at the photo-cathode, quite apart from damage to the photo-cathode.

Reduction of ion feedback from channel plate to photo-cathode can lead to improved life. In addition, reduction of ion feed-back permits operation in the pulse saturation mode, and this can result in a more favourable pulse height distribution (P.H.D.) and reduced noise. Furthermore, reduction of spurious secondary electron cascades resulting from ion feedback to the channel wall near the input can allow a plate to be operated at higher gain (for use in photomultipliers, for example).

With channel plates used in multi-channel electron multipliers and imaging tubes attempts have been made to overcome or reduce ion feedback in the following ways:

A. U.S. Pat. No. 3,603,832 (Mullard) describes the provision of electron-permeable conductive membranes provided to obturate the entrances to the channels and thus prevent the passage of ions to the photocathode. This technique is relatively difficult and expensive especially for plates of large area.

B. U.S. Pat. No. 3,374,380 (Bendix) describes what is sometimes referred to as a "chevron" construction in which two separate channel plates are arranged in series with each other with the channel axes of one plate disposed at an angle to the channel axes of the other plate. This arrangement has the disadvantage that individual channels of one plate are not aligned with individual channels of the other plate so that definition is lost, and this loss is increased by the gap which appears to be present between the two plates in the practical arrangements available.

Since the publication of these prior patent specifications further studies of the ion feedback effect have been carried out by Applicants and they have discovered that the position now appears to be as follows.

For a channel having a 50:1 length-to-diameter (L/D) ratio Applicants have discovered that about 75–90 percent of ions formed inside the channels and which escape from the input may be formed in the last (i.e., output) 30 percent of the length of the channel (the terms "input and output" are used herein exclusively with reference to electrons).

On the basis of this discovery, applicants have provided the following further solutions:

C. U.S. Pat. application Ser. No. 247,955, filed Apr. 27, 1972 describes a matrix for a channel intensifier device of the kind set forth in which the axes of the channels are curved in one plane.

D. U.S. Pat. application Ser. No. 267,111, filed June 28, 1972 describes matrices composed of multichannel units having twisted septa.

E. U.S. Pat. application Ser. No. 267,002, filed June 28, 1972 describes matrices composed of twisted groups of channel tubes.

The latter solutions (D) and (E) are based on modifications of the Bendix "Spiraltron" principle.

The main object is, in all cases, to prevent ion feedback or, to use an alternative expression, to render the channels "ion blind" and a secondary object (for some applications) is to render them also "optically blind" to prevent optical feed-back from the display screen (for the latter purpose the matrix must be made opaque).

The present invention provides a further alternative solution to the ion feed-back problem in channel plates.

The invention is based on a novel theory which has recently been evolved by applicants and which contradicts or modifies the assumptions underlying the aforesaid Bendix "chevron" principle forming the basis of their U.S. Pat. No. 3,374,380 and also the tilted channel principle employed in the U.S. Pat. No. 3,235,765 and in Bendix U.S. Pat. No. 3,235,765.

A major disadvantage of the chevron arrangement, at least for imaging purposes, is the loss of resolution due to electrons from one channel in the first plate spreading into several channels in the second.

Perfect alignment would be required between all the channels of the two plates to overcome this, but the degree of channel location is not sufficiently accurate in imaging plates made by conventional fibre drawing methods to allow plates of opposing angle to be so assembled.

The Bendix "chevron" Patent is based on hitherto accepted channel multiplication theory and therefore postulates the need for the two plates to have different angles (i.e., a "chevron" arrangement) in order for ions produced in the output plate to become absorbed in the wall of the input plate (before nearing its input) so that they do not produce undesirable trains of secondary electrons. According to one aspect of the present invention, this can be achieved by using surface-conducting plates having channels at the same angle. According to a further aspect of the invention, this can be achieved by using channels whereof the surface conductivity is different for different parts of the inner surface of a channel.

Therewith other advantages in bulk conduction for tilted channel plates, notably the possibility of preventing ion feedback and of achieving this with a single plate instead of the two-plate tandem arrangements described in U.S. Pat. No. 3,374,380 (Bendix) and above are incorporated.

It is known that a tilted channel plate of the bulk conduction type has considerable advantages. Although bulk conduction has been considered from the beginnings of the channel multiplier art, there has been great difficulty in finding bulk-conductive materials suitable in all respects for channel plate manufacture and operation, so much so that all the channel plates hitherto commercially available for imaging purposes appear to have been of the surface-conduction type. In fact, for technological reasons it has been found preferable hitherto to construct channel plates from an insulating glass which is then subjected to a surface-conducting treatment inside the channels. (Examples of suitable glasses and treatments are described in U.S. Pat. No. 3,641,382, these being lead glasses on which surface-conducting channel layers are formed by chemical reduction).

Thus it is a further object of the invention to provide a tilted surface-conduction structure which will enable a channel plate to have electrical properties similar to those of a tilted bulk-conduction plate, notably the property of maintaining the equipotentials substantially parallel to the faces of the plate even though the channels are tilted. Such a structure has been evolved as a result of the aforesaid theory.

Accordingly, the invention provides a matrix for a surface-conducting channel intensifier device or channel plate of the kind set forth in which matrix the channels are tilted with respect to the normal to the matrix faces and the inner surface of each channel provides areas of differing conductivity, the conductivity being greatest in the regions of the channel which have the greatest inclination with respect to the normal to the matrix faces and the conductivity being least in the regions of smallest or zero inclination.

The theoretical basis for this will now be described with reference to the accompanying diagrammatic drawings in which.

Figure 13A:
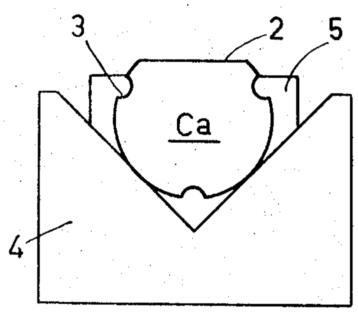
Figure 13B:
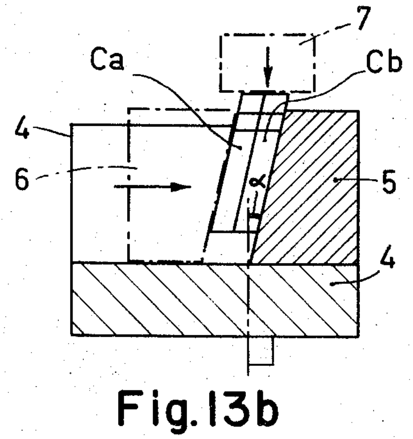

FIG. 13*a* is an end view of a pair of slices positioned in a V-shaped jig for processing into channel plates;

FIG. 13*b* is a sectional side view of FIG. 13*a;*

Figure 14:
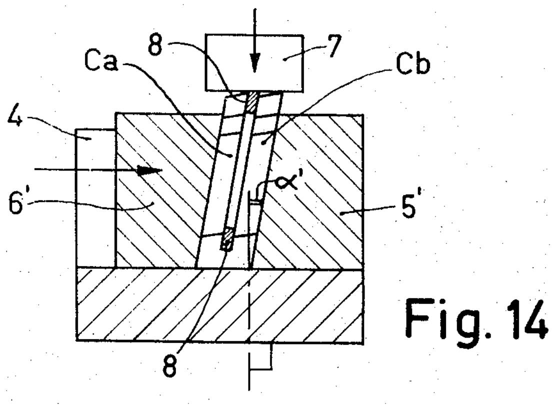

FIG. 14 shows in a sectional view a modification of FIG. 13*b;*

Figure 15A:
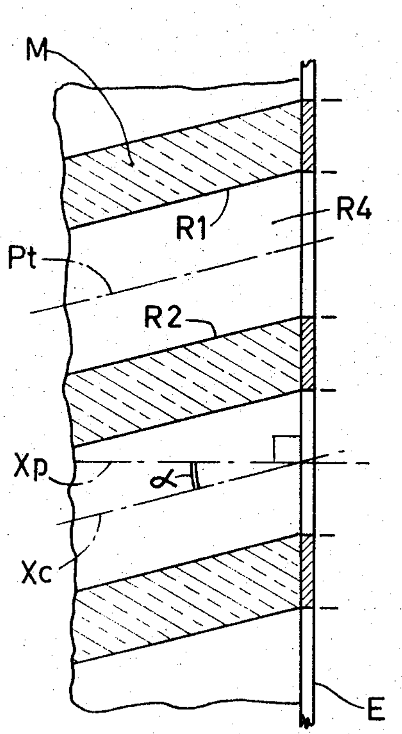
Figure 15B:
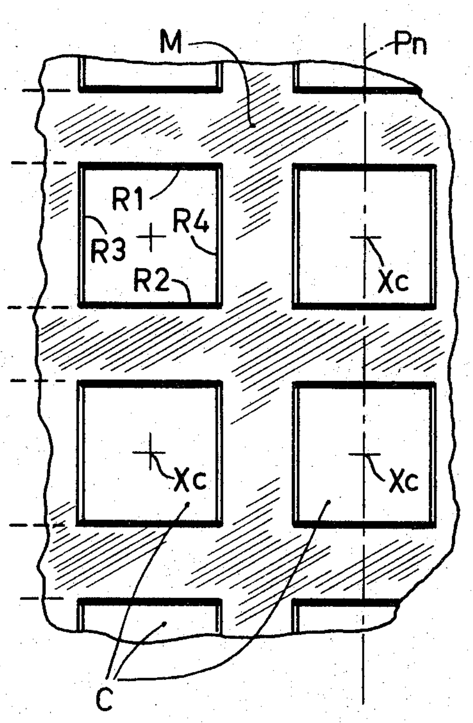

FIG. 15*a* is a cross-sectional side view of a cut-away portion of a channel plate;

FIG. 15*b* is a front view of the channel plate of FIG. 15*a;*

Figure 16:
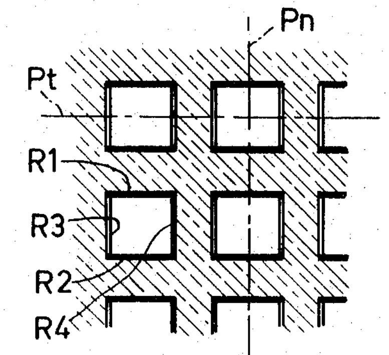
Figure 17:
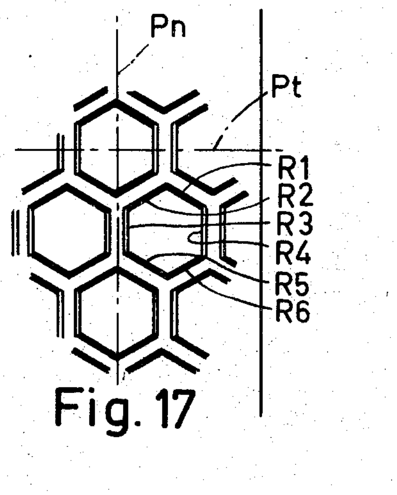
Figure 18A:
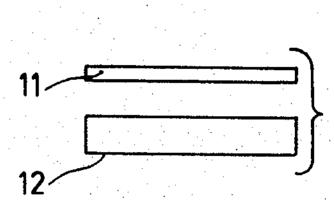
Figure 18B:
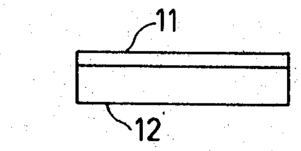
Figure 18C:
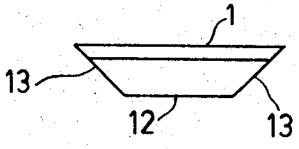
Figure 18D:
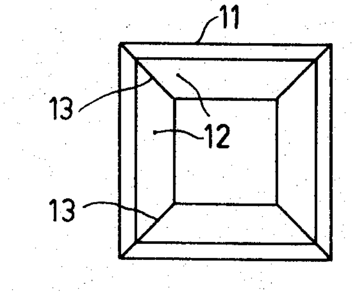
Figure 19A:
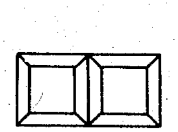
Figure 19B:
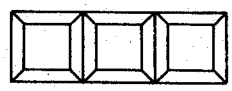
Figure 19C:
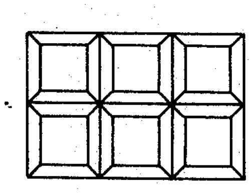
Figure 20:
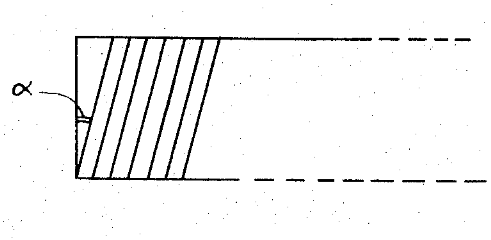
Figure 21:
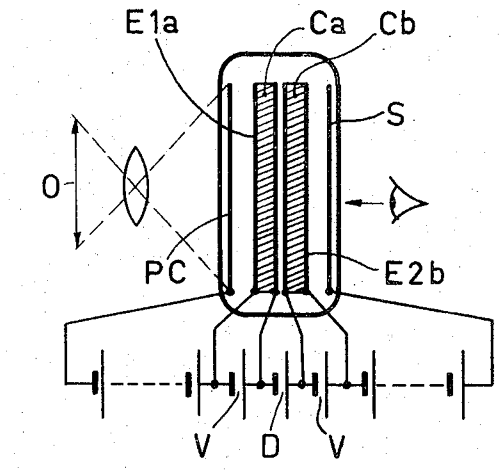
Figure 22:
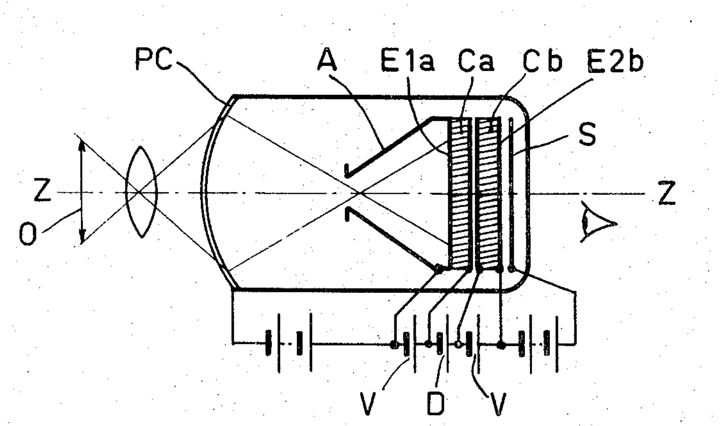

FIG. 16 is a cross-section of the channel plate of FIGS. 15*a* and 15*b* in a plane normal to the axes of the channels;

FIG. 17 is a similar view as in FIG. 16 but showing a hexagonal configuration of each channel;

FIGS. 18*a* to 18*c* show three stages in a modified formation of channel plates by using flat strips of glass;

FIG. 18*d* shows four strips of FIG. 18*c* assembled into a tubular structure which can be drawn down to a hollow fibre for forming a channel plate;

FIGS. 19*a* to 19*c* show different multi-fibre assemblies of rectangular cross-section;

FIG. 20 is a side view of an end portion of the resulting boule of parallel fibres sliced by cutting at an angle;

FIG. 21 is a schematic side section of a proximity-type imaging tube using a pair of channel plates of this invention; and FIG. 22 is a schematic side section of an inverter-type imaging tube using channel plates according to this invention.

Figure 1:
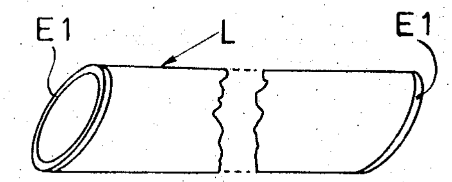
FIG. 1 is a perspective view of a single channel as formed in an angled channel plate.

A single channel multiplying tube from an angled channel plate will be considered first. FIG. 1 represents said channel diagrammatically as a tube of low-conductivity material L having at each end a ring (E1–E2) of high conductivity material (in practive, of course, L is usually a resistive layer on the inner wall of a channel formed in a glass matrix and rings E1–E2 are parts of the input and output electrodes of the faces of the channel plate). Ions travel along electric lines of force normal to the electric equipotentials, the reason being that a residual gas molecule being uncharged, will not be moving in any particular direction until it is converted into an ion by impact from an electron. Hitherto it has been believed that equipotentials were parallel to the channel ends i.e. to the faces or electrodes of the channel plate (see for example the said U.S. Pat. No. 3,235,765. However, it now appears that this is not so for the surface-conducting channels normally used.

Figure 2:
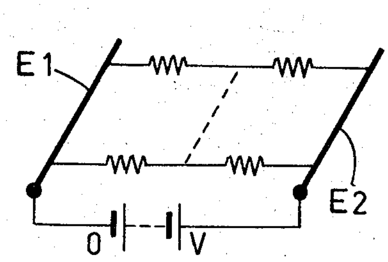
FIG. 2 is a schematic electrical diagram of a theoretical distribution of resistive paths and the resulting equipotential in the channel of FIG. 1.

By representing opposing walls of an isolated channel as resistor chains, the channel of FIG. 1 appears as shown in FIG. 2 where the potential across the channel plate is $V$ volts and the two chains are connected at their ends by the metal electrodes E1–E2 on the two faces of the channel plate. If the resistors $R$ are of equal value, the dotted line will represent the equipotential $V/2$ which will be parallel to the end electrodes in the manner previously assumed.

Figure 3:
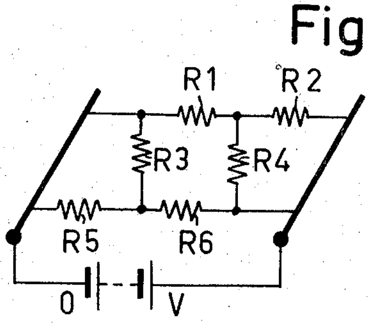
FIG. 3 is an electrical diagram of the actual distribution of resistive paths in the channel of FIG. 1.
Figure 4:
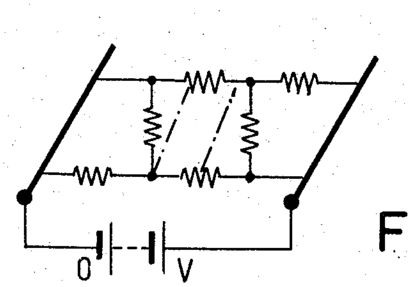
FIG. 4 is similar to FIG. 3 and indicates the resulting equipotentials.

However, in practice the two resistor chains are interconnected by resistors which will have their minimum effective value at right angles to the channel axis as shown in FIG. 3 (it will be assumed again, for the sake of argument, that all resistors are of equal value $R$). In this case the current flowing between E1 (at potential O) and E2 (at potential $V$) travels through two parallel paths. The upper path consists of R1 in series with two R's (R2 and R4) in parallel, i.e., $R$ in series with $R/2$. The lower path is the same only reversed (R3 and R5 in series with R6). In each path 2V/3 will be the potential across the single resistor $R$ and $V/3$ the potential across the pairs of resistors $R$ in parallel. The equipotentials will thus appear as in FIG. 4 and are clearly closer to the normal to the channel axis than in the case of FIG. 2.

Figure 5:
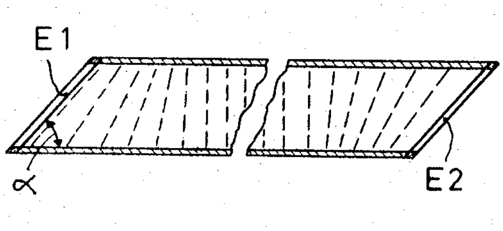
FIG. 5 is a cross-sectional view of the channel of FIG. 1 and indicates the actual distribution of equipotentials.

This very simple illustration is used to demonstrate the new theory according to which the equipotentials deviate from planes parallel to the channel ends. It represents only a very short channel and is a considerable simplification of the far more complex resistance paths existing in an actual channel. From investigations carried out by the Applicants the position appears to be as illustrated in FIG. 5 for a channel having (for purposes of clarity) an angle $\alpha = 45°$ and a length-to-diameter ratio of only 20. FIG. 5 shows that, within a distance equal to two channel diameters from the end, the equipotentials are normal to the channel and hence the field becomes axial, and remains so until two diameters or so of the other end.

Figure 6:
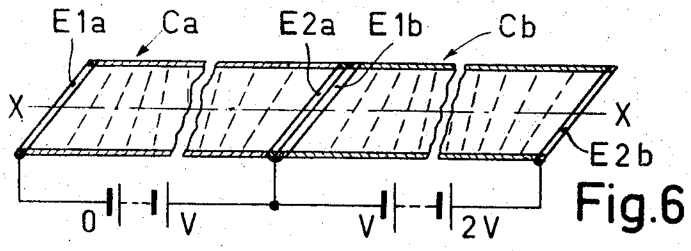
FIG. 6 is a cross-sectional view of a tandem pair of channels according to this invention.

Now let us consider two such channels ($Ca$ – $Cb$) joined end to end along a common axis X each with a conducting element or electrode at each end of each channel. The equipotentials are shown in FIG. 6.

Ions formed in the region near the output will travel back axially until they reach the region of distorted field at the junction between the two channels. Here they are deflected to collide with the wall of channel $Ca$. As in the "chevron" case, they will not reach points close enough to the input of $Ca$ to produce undesirable after-pulses of secondary electrons. The deflection effectiveness of this $Ca$–$Cb$ junction region can be enhanced by separating the two channels and applying a voltage $D$ between them (see FIG. 7). This extends the length of the region of non-axial field.

Figure 8:
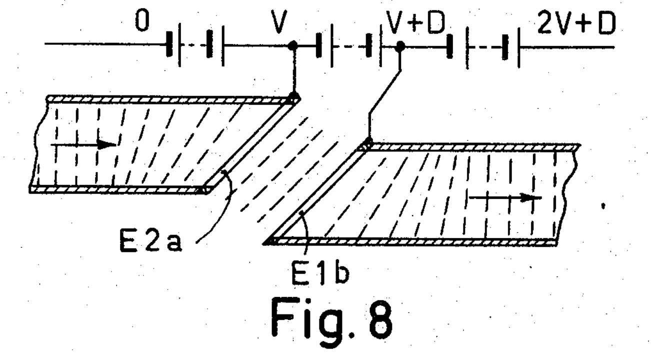
FIG. 8 is another modification of the tandem pair of FIG. 6.

In addition, it is possible to effect lateral displacement of channel $Cb$ so that it collects electrons more effectively, as they too will be deflected by the non-axial field (see FIG. 8).

Reverting now to the case of a multiple array of angled channels, i.e., a single angled channel plate, the new theory takes account of a further factor, whether or not there is any influence on the field distribution due to interaction between adjacent channels. This will depend on the nature of the channel matrix which can either be substantially an insulator or else it can support a flow of electrons through it. In the former case it is necessary to develop or apply a conducting film or coating on the inside wall of each channel. This can be achieved e.g. by using a lead-containing glass which is heated and reduced in a hydrogen atmosphere (see, for example, the U.S. Pat. No. 3,641,382). In this instance there is no interconnection between adjacent conducting tubes except through the electrodes E1 – E2 deposited on their ends. Along their length the conducting tubes are separated by a layer of insulating matrix material, typically glass. Each tube will thus contain a field determined by the equipotential pattern shown in FIG. 5, i.e., the field will be axial along most of the channel length. This is illustrated in FIG. 9 which shows equipotentials of equal voltage difference at one end of two adjacent channels.

Figure 9:
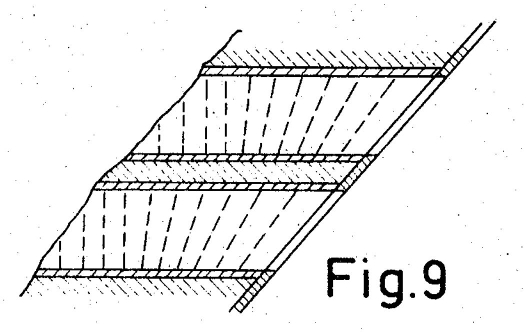
FIG. 9 is a cut-away sectional view of the single channel plate with two adjacent channels and indicates equipotentials at one end of each channel.

If a matrix is used which conducts through its bulk, the equipotential pattern of FIG. 9 cannot exist due to the low resistive paths linking the inside surfaces of adjacent channels, and these result in a pattern in which all the equipotentials are tilted planes parallel to the faces of the plate. Such a plate is not relevant to the present invention since the field in the channels is no longer axial.

Figure 7:
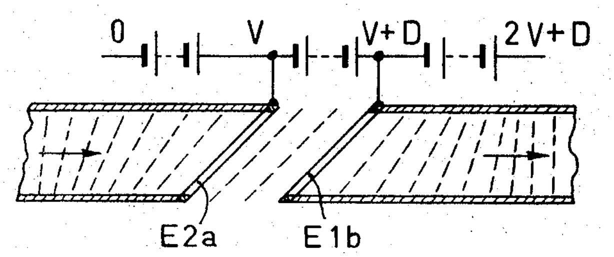
FIG. 7 is a modification of the tandem pair of FIG. 6.

FIG. 9 shows the equipotential distribution in one angled surface-conducting channel plate, and FIGS. 7–8 demonstrate how the ion deflection region can be made more effective by separating the two channel plates and providing a potential difference between them. Thus a pair of angled surface-conducting channel plates can reduce ion feedback effects even though the channel axes of the plates are parallel. Evidence supporting the theory on which the present invention is based has recently been obtained by Parkes and Gott from work carried out at the University of Leicester but not yet published. Parkes and Gott have operated experimentally pairs of angled surface-conducting Mullard plates at very high gains, where they observed effective elimination of ion feedback effects not only in chevron arrangements but also with parallel channel axes. The channels in these plates had axes angled at 13° to the plate axis (i.e., the normal to the plate faces). However, in these experiments the plates were not used in an imaging application and no attempt was made to obtain channel-to-channel alignment between the two plates. Moreover, the unexpected effect was not explained satisfactorily in the absence of the theory herein disclosed.

According to a further aspect of the present invention, an assembly of a tandem pair of angled plates has parallel channel axes and sufficient channel-to-channel registration to ensure that at least the major part of the information contained within one input channel is transferred only to the corresponding output channel, and not to any other adjacent channels. The invention also provides methods of achieving such registration in the course of manufacture and assembly.

One of the most convenient methods is to hold the pair of channel plates in alignment with a jig and then to join the plates together. The pair of plates are then removed from the jig and behave as one complete unit. Another method is to mount the plates in a holder which aligns them, and then treat the plates and holder as one unit, but alignment is more difficult.

Figure 10:
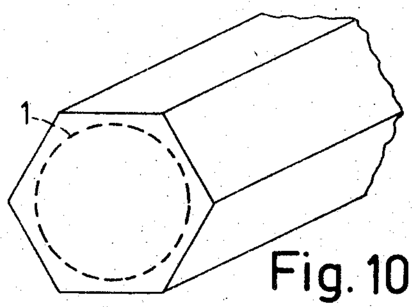
FIG. 10 is a hexagonal boule for use as starting material in manufacturing tandem channel plates of this invention.

The following is a practical case described with reference to the hexagonal configuration for the sake of simplicity (it could be applied to others, e.g. a square configuration). This method comprises the following steps:

1. First the hexagonal boule of FIG. 10 is ground to circular section (as indicated by the dotted line 1).

Figure 11:
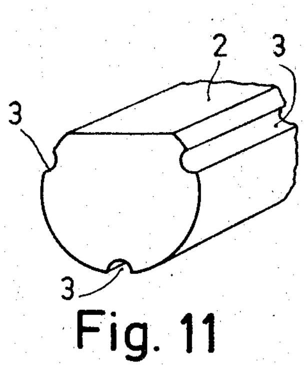
FIG. 11 is a machined boule of FIG. 10.

2. The next step is to grind an accurate location flat 2 and several fixing or locating grooves 3 along the length of the bundle (three are shown as a convenient number in FIG. 11). The accurately machined flat 2 must be of adequate width, say half the diameter. The shape of the fixing grooves is not critical, and they could be holes or bores instead of grooves although that would be wasteful of matrix area.

Figure 12:
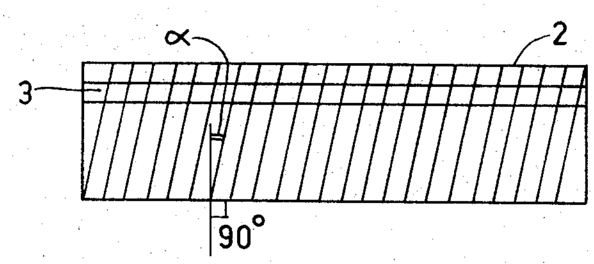
FIG. 12 is a side view of the boule of FIG. 11 cut into slices at an angle.

3. The boule is then cut into slices at an appropriate angle $\alpha$ as shown in FIG. 12 ($\alpha = 13°$ is one example of a suitable angle). Of course, it will be understood that the channel axes are parallel to flat 2 and to the sides of the boule.

3A. The normal processing is now carried out whereby the slices or matrices are turned into channel plates in known manner. Notably, the conductive channel surfaces are obtained e.g. by chemical reduction and the input and output electrodes are formed on the matrix faces. It is essential to keep the plates identified as adjacent pairs.

4. Two adjacent plates C*a*–C*b* are placed in a V-shaped jig or block 4 (See FIG. 13 where —*a* is an end view and 13*b* is a side view partly in section). The end block 5 of the jig is accurately machined to the angle $\alpha$ (FIG. 13*b*). (The '*V*' groove of the jig will allow precise registration once the flats in both plates have been aligned).

5. An angled holding block 6 (FIG. 13*b*) is placed next to the plates so that the face of this block and that of the end block are parallel and orientated at the angle $\alpha$.

6. The plates C*a*–C*b* are rotated as necessary until the flats 2 are both in same plane. (This is checked with a dial gauge or similar gauge if necessary). The plates are then clamped in position.

7. A clamp 7 (FIG. 13*b*) is applied to the flats 2 to prevent any movement which might misalign them. (Obviously, supporting means for the clamp and blocks are required but are not shown for the sake of simplicity). The machined flats 2 thus provide accurate control over plate rotation. By this means precise channel-to-channel registration is possible using adjacent pairs of plates sliced from the same boule.

8. The plates are now fixed together by any of the suitable methods of joining glass components known to the trade and suitable for use in vacuum. Examples:

*a*. "silicate cement" (Potassium silicate and ceramic powder) in the grooves 3.

*b*. Three ceramic or glass rods cemented into grooves 3.

*c*. Three such rods fixed with enamel instead of cement.

*d*. Three such rods fixed with glass binder loaded tape (e.g. Vitta-tape, a product of the Vitta Corporation).

These processes need some heat treatment. This will partially oxidise the exposed reduced conducting surfaces in the channels and therefore further chemical reduction (e.g. in hot hydrogen) will normally be necessary.

The original first reduction is desirable to allow good contact to the input and output electrodes. The electrodes E2*a*–E1*b* (*cf.* FIG. 6) at the interface must of course be applied before the joining process.

In the case where a space is required between the plates (as in FIG. 7) the joining process is carried out with spacing shims between the plates around the periphery. These shims are removed after the joining process. A hard metal is a suitable shim material.

In the case where lateral displacement of the channels is required (as in FIG. 8) the end blocks 5 – 6 can be made with an angle which is smaller than $\alpha$. This can be carried out as shown in FIG. 14 with the same V-block 4 and clamp 7. As before, the plate faces are at an angle $\alpha$ to the normal to the channel axes, but blocks 5′ – 6′ are angled at an angle $\alpha'$ smaller than the angle $\alpha$ of FIG. 13. Two of the spacing shims are shown at 8.

It may be advantageous in the above method to use channel plates with solid glass rims, this being especially so in the last case (FIG. 14) where plate location is on edges instead of flats.

In order to facilitate alignment of the pairs of plates it is possible to incorporate in the operative peripheral areas of the boule two or more marker fibres or groups of fibres which can be identified and accurately aligned during assembly of each pair. Such fibres may for example be identified visually with the aid of a microscope.

In FIG. 15 a generalized representation of a section taken along the channel axes (FIG. 15*a*) and an end view of one face of the plate with the end electrode (E) removed (FIG. 15*b*) is represented. The matrix material is shown as an insulator M occupying the space between the channels C.

Each channel has two tilted walls or surfaces R1–R2 of lower resistivity (higher conductivity) and two walls or surfaces R3–R4 of higher resistivity (in principle the latter could have definite resistivity but, in practice, this would cause electrostatic charging of the surfaces and other problems). Walls R1–R2 provide most of the electron multiplication.

The channels are shown tilted at an angle $\alpha$ to the normal to the faces of the plate.

For the purpose of reference it is convenient to adopt a notional plate or matrix axis X*p* (FIG. 15*a*) which is normal to the faces of the plate or matrix and therefore forms an angle $\alpha$ with any channel axis X*c*. Similarly, it is convenient to refer to a "normal plane" P*n* (FIG. 15*b*) for each channel, such plane containing the channel axis X*c* and being normal to said faces so that it represents the direction in which the channel is not tilted. A second useful reference plane is the plane P*t* (FIG. 15*a*) which also contains the channel axis but is normal to the plane P*n* and represents the degree of inclination of the channel (it is therefore referred to as the inclined or "tilted" plane of the channel). When considering a cross-section normal to the channel axes (as in FIGS. 16 and 17) both planes P*n*–P*t* become normal to the plane of the drawing.

FIG. 16 shows the same structure as a cross-section normal to the channels and, by way of comparison, FIG. 17 shows a similar cross-section of a hexagonal arrangement. In FIG. 17 there are four tilted low-resistance walls or surfaces providing most of the electron multiplication (R1–R2 and R5–R6) and two high-resistance walls R3–R4 which are parallel to the normal plane (P*n*) and therefore are not tilted. Other cross-sections are possible according to the invention and it is possible to envisage these examples extended to a limit case in which the channel section is circular and the resistivity is continuously graded from a minimum value on the generatrices where the channel wall intersects the normal plane P$n$ to a maximum value on the generatrices where the channel wall intersects the tilted plane P$t$ (although such an arrangement is possible it would be very difficult to reduce to practice with present techniques).

Reverting to the square channel configuration of FIGS. 15 and 16, let us consider how the resistance differentials can be achieved in practice. Applicants have previously described a method for making channel plates using flat strips of glass in preference to the more usual glass in tubing form (U.S. Pat. application Ser. No. 220,270, filed Jan. 20, 1970). One such example is given in FIG. 18 which shows the cross-section of a unit prior to drawing into fibres.

FIG. 18 shows three stages in the formation of composite strips 11–12 having bevelled longitudinal edges 13 (FIGS. 18*a* to 18*c*). Four such strips are assembled into a tubular structure (FIG. 18*d*) which can then be drawn down to fibre.

For the present purposes, the assembly may be a tube of channel glass 11 with a supporting core 12 of differentially etchable glass which is hollow to facilitate etching out.

Alternatively, the assembly may be a tube of channel glass 12 having an external sheath of low-melting-point glass 11 to facilitate the fusing of adjacent tubes (and the filling of any interstices).

In both cases one pair of opposite strips of matrix glass will differ in its properties from the other pair so that one pair has higher resistivity than the other in the final matrix. For example, by selecting channel glasses of two suitable compositions it is possible to arrange for the strips corresponding to R3–R4 to have a higher surface resistance on reduction than the strips corresponding to R1–R2. With the glasses described in the previously mentioned U.S. Pat. No. 3,641,382 differences of surface resistivity of up to four orders of magnitude may be obtained. Moreover, very large differences can be obtained by very small changes in composition so that the two kinds of matrix glass can fuse together readily at the corners. To obtain full benefit of the advantage of the present invention the four strips are held together without a core glass in the middle while the assembly is drawn down to a hollow fibre.

It is, of course, necessary that the fibres be correctly orientated with respect to the angle $\alpha$ at which the plate is subsequently cut, so as to ensure that the high-resistance components R3–R4 are parallel to the plate axis X$p$ (i.e., normal to the cuts) while the low-resistance elements R1–R2 are at an angle $\alpha$ to said axis. When drawn to fibre, the dimensions are small enough to make such orientation difficult. It may therefore be advantageous to determine the orientation before drawing, and to draw an assembly of several correctly aligned units together so as to obtain a multi-tube fibre of rectangular cross-section (some examples are shown in FIGS. 19*a* to 19*c*).

In a two-draw-process the multi-fibre assembly for the second draw can similarly be given a rectangular cross-section. This provides a simple method of identifying the high and low resistance planes corresponding to planes P$t$ and P$n$ respectively.

FIG. 20 shows a resulting boule of parallel fibres which is sliced by cutting at the angle $\alpha$, one example of a suitable angle being $\alpha = 13°$.

The normal processing is then carried out whereby the slices or matrices are turned into channel plates in known manner. Notably, the cores (if present) are removed and the conductive channel surfaces are obtained e.g. by chemical reduction. Also, the input and output electrodes are formed on the matrix faces.

FIGS. 21 and 22 illustrate the use of channel plates in accordance with the invention in imaging tubes. In the examples given, a pair of channel plates C$a$ and C$b$ is shown inside the envelope of an image intensifier tube containing also a photo-cathode PC and a luminescent screen S. FIG. 21 shows a tube of the "proximity" type while FIG. 22 shows a tube of the "electron-optical diode" or "inverter" type.

When a display screen S is used, the plates C$a$–C$b$ can be made opaque so as to prevent optical feedback from S as well as ion feedback.

The invention may also be used for other imaging tubes, for example cathode-ray display tubes and camera tubes.

In addition to ion and optical blindness, a channel plate according to the invention can prevent the "dark patch" or "black spot" defect described in U.S. Pat. No. 3,487,258.

What is claimed is:

1. A channel-type electron multiplier comprising a tandem pair of non-conductive plates each having end walls of high conductivity material arranged in substantially parallel planes and a plurality of elongate channels opening at said end walls, said channels having surface of low conductivity material for producing secondary emission when impinged by an electron beam, channels in one plate being at least partially in registration with assigned channels in the other plate and channels in both plates extending substantially in the same direction and being inclined substantially at the same angle with respect to the planes of corresponding end walls.

2. A multiplier as claimed in claim 1 characterized in that the inner surface of each channel provides areas of differing conductivity.

3. A multiplier as claimed in claim 2 wherein the low-conductivity and the higher-conductivity walls of each channel are made of metal-containing glasses of similar composition except for a difference which allows the required difference in conductivity to be obtained by differential response to chemical reduction.

4. A multiplier as claimed in claim 1 wherein the angle of inclination is approximately 13°.

5. A multiplier as claimed in claim 1 wherein said plates are spaced apart by a distance comparable with the channel diameter.

6. A multiplier as claimed in claim 5 wherein the channels of the coupled channel plates are transversally displaced by a distance comparable with half a channel diameter.

7. A multiplier according to claim 1, wherein the facing end walls of said plates are in abutment with one another.

8. An electronic imaging tube comprising an evacuated envelope, a photo-cathode within said envelope, a luminescent screen within said envelope at the end opposite said photo-cathode, an electron multiplier positioned between said photo-cathode and said screen within said envelope, said electron multiplier comprising a tandem pair of plates of insulating material, a plurality of elongate channels of the surface-conducting type embedded in each plate in form of a matrix, and input and output electrodes provided on the end walls of said plates and coupled to the conductive surfaces of said channels, said end walls being arranged in substantially parallel planes, the matrix in one plate being at least partially in registration with the matrix in the other plate, the channels in both matrixes extending substantially in the same direction and being inclined at the same angle with respect to the planes of said end walls, and means for energizing said electrodes.

* * * * *